Feb. 28, 1928.
J. PALUBIAK
1,661,084
INSECT TRAP
Filed July 5, 1927
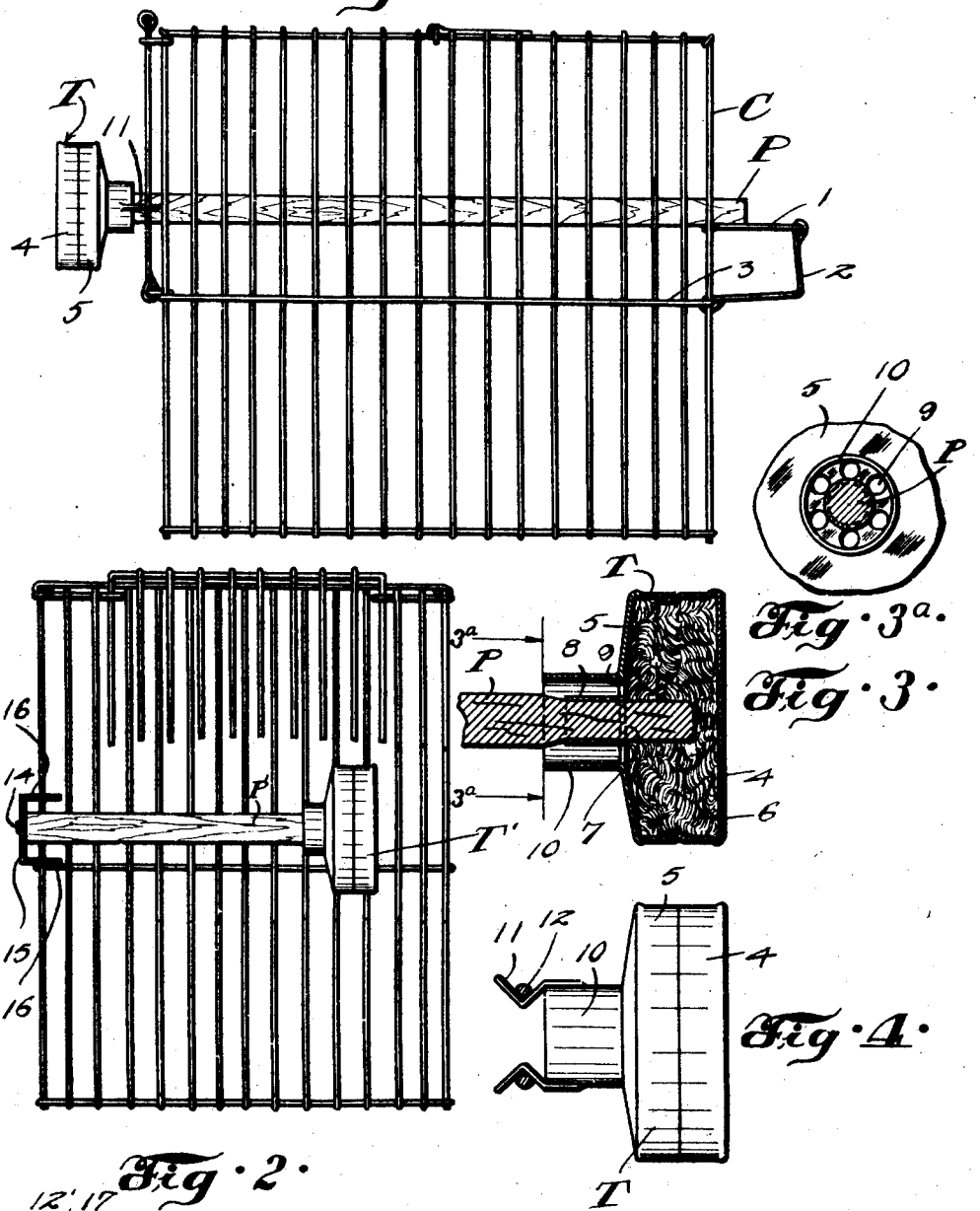
INVENTOR
John Palubiak
By Watson E. Coleman
ATTORNEY Patented Feb. 28, 1928.

UNITED STATES PATENT OFFICE.

JOHN PALUBIAK, OF ST. LOUIS, MISSOURI.

INSECT TRAP.

Application filed July 5, 1927. Serial No. 203,470.

This invention relates to insect traps and it is primarily an object of the invention to provide a device of this kind especially designed and adapted for use in connection with bird cages and which is employed to capture bird lice.

Another object of the invention is to provide a device of this kind provided with means whereby it may be effectively mounted and maintained in applied or working position and whereby the captured insects may be readily removed for destruction.

The invention consists in the details of construction and in the combination and arrangement of the several parts of my improved insect trap whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in side elevation illustrating a trapping structure constructed in accordance with an embodiment of my invention in applied position;

Figure 2 is a view in elevation illustrating a trap constructed in accordance with a further embodiment of my invention;

Figure 3 is a detailed sectional view of the trap member herein employed and the coacting end portion of a perch;

Figure 3ª is a fragmentary sectional view taken substantially on the line 3ª—3ª of Figure 3;

Figure 4 is a view in top plan of the trap member as illustrated in Figure 1;

Figure 5 is a fragmentary view in top plan of the outer end portion of the perch as illustrated in Figure 2.

As illustrated in Figure 1, C denotes a bird cage of any ordinary or preferred type and through which is disposed a perch P. One end portion of the perch P is provided with an outstanding rod 1 with which is operatively engaged an angular bracket 2. This bracket 2 is also fixedly secured to a horizontal strand 3 comprised in the cage structure whereby said bracket 2 affords a support for one end portion of the perch P.

The trap member T comprises a box-like structure consisting of two members 4 and 5 herein disclosed as having slip connection one with the other. This member T is adapted to contain a filler 6 of raw cotton or kindred material.

The inner member 5 at its axial center is provided with a central opening 7 defined by an outstanding sleeve 8. An end portion of the perch P is adapted to be snugly disposed through the sleeve 8 whereby the trap member is effectively mounted on the perch. Disposed in the central portion of the member 5 around the opening 7 and outwardly of but immediately adjacent to the sleeve 8 is an annular series of openings 9 constituting entrance openings into the assembled trap member T. The member 5 outwardly of the openings 9 but closely adjacent thereto is provided with a second outstanding sleeve 10 concentric to the sleeve 8 but of a length to extend beyond the outer end portion of the sleeve 8.

The outer portion of the sleeve 10 is provided with the diametrically opposed resilient arms 11 extending beyond the outer end of the sleeve 10. These arms 11 are adapted to be positioned between adjacent vertical strands 12 of the cage C and frictionally engage the same, thus providing an effective medium for supporting the adjacent end portion of the perch P.

The lice after leaving the bird within the cage C will travel along the perch P and enter the trap member T through the openings 7 and secrete themselves in the cotton filler 6. After this filler 6 has become infested with the lice, such filler is taken out and burnt or subjected to other suitable action to destroy the insect life. Upon replacement of a new filler within the member T, my improved trap is ready for further use.

The sleeve 10 serves to facilitate the travel of the lice into the trap member as the insects have a natural tendency to pass into a shaded chamber. Furthermore, this sleeve serves as a shield to facilitate the travel of the insects toward the openings 9.

In the embodiment of my invention as illustrated particularly in Figure 1, the trap member T projects exteriorly of the cage but in the assembly as illustrated in Figure 2, the trap member T' is arranged within the cage. This member T' is constructed in the same manner as hereinbefore set forth with respect to the member T and is mounted in the same manner upon the inner end portion of a relatively short perch member P'. The outer portion of the perch member P' is secured, as at 14, to the central portion of a flat plate 15. Each extremity of the plate 15 is provided with an inwardly disposed plate 16 provided in its side marginal portions with notches 17. The plates 16 are adapted to be engaged between adjacent vertical strands of the cage, said strands 12' being received within the notches 17 and in a manner whereby the perch P' together with the trap member T' are maintained in desired arrangement within the cage.

From the foregoing description it is thought to be obvious that an insect trap constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An insect trap for a cage comprising a box-like member, a perch, the inner wall of the box-like member having a sleeve extending therefrom within which is engaged an end portion of the perch, said inner wall having an annular series of entrance openings surrounding the sleeve, a fibrous filler within the box-like member, and a second sleeve extending from said inner wall and arranged outwardly of but in close proximity to the openings.

2. An insect trap for a cage comprising a box-like member, a perch, the inner wall of the box-like member having a sleeve extending therefrom within which is engaged an end portion of the perch, said inner wall having an annular series of entrance openings surrounding the sleeve, a fibrous filler within the box-like member, and a second sleeve extending from said inner wall and arranged outwardly of but in close proximity to the openings, said second sleeve being of a length to extend beyond the outer end portion of the first sleeve.

3. An insect trap for a cage comprising a box-like member, a perch, means for mounting the box-like member upon an end portion of the perch, the inner wall of the box-like member having an annular series of entrance openings surrounding the perch, a fibrous filler within the box-like member, a sleeve extending from said wall of the box-like member and arranged outwardly of but in close proximity to the openings, and securing means carried by said sleeve.

In testimony whereof I hereunto affix my signature.

JOHN PALUBIAK.